(12) United States Patent
Oran

(10) Patent No.: US 8,031,701 B2
(45) Date of Patent: Oct. 4, 2011

(54) RETRANSMISSION-BASED STREAM REPAIR AND STREAM JOIN

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 11/561,237

(22) Filed: Nov. 17, 2006

(65) Prior Publication Data

US 2008/0062990 A1 Mar. 13, 2008

Related U.S. Application Data

(60) Provisional application No. 60/825,268, filed on Sep. 11, 2006.

(51) Int. Cl.
*H04L 12/66* (2006.01)
*H04L 12/28* (2006.01)
*H04L 1/18* (2006.01)

(52) U.S. Cl. .......................... 370/356; 370/390; 714/748

(58) Field of Classification Search .................. None
See application file for complete search history.

(56) References Cited

U.S. PATENT DOCUMENTS

| | | | |
|---|---|---|---|
| 3,840,862 A | 10/1974 | Ready | |
| 4,291,196 A | 9/1981 | Spaniol et al. | |
| 4,426,682 A | 1/1984 | Riffe et al. | |
| 4,802,085 A | 1/1989 | Levy et al. | |
| 4,811,203 A | 3/1989 | Hamstra | |
| 5,155,824 A | 10/1992 | Edenfield et al. | |
| 5,307,477 A | 4/1994 | Taylor et al. | |
| 5,524,235 A | 6/1996 | Larson et al. | |
| 5,551,001 A | 8/1996 | Cohen et al. | |
| 5,636,354 A | 6/1997 | Lear | |
| 5,734,861 A | 3/1998 | Cohn et al. | |
| 5,828,844 A | 10/1998 | Civanlar et al. | |
| 5,870,763 A | 2/1999 | Lomet | |
| 5,926,227 A | 7/1999 | Schoner et al. | |
| 5,933,195 A | 8/1999 | Florencio | |
| 5,933,593 A | 8/1999 | Arun et al. | |

(Continued)

FOREIGN PATENT DOCUMENTS

EP 1271953 1/2003

(Continued)

OTHER PUBLICATIONS

Rosenberg,J., et al., "Registration of parityfec MIME types", RFC 3009, Nov. 200, 11 pages.

(Continued)

*Primary Examiner* — Melanie Jagannathan
(74) *Attorney, Agent, or Firm* — Stolowitz Ford Cowger LLP

(57) ABSTRACT

The Real-time Transport Protocol (RTP) and its related standards define a retransmission packet format and a way to give feedback via Negative ACKnowledge (NACK) packets for data that has been lost. In one embodiment, a unicast RTP repair session is associated with a main Source Specific Multicast (SSM) multicast session. Real-time Transport Control Protocol (RTCP) NACK packets are then used for feedback to a SSM feedback target address. This dynamically instantiates unicast RTP repair for multicast sessions. The repair scheme can be used for repairing multicast channels or joining new multicast channels. In another embodiment, a media transmission device shares an IP address with one or more other media transmission devices. The shared IP address can also be used to route multiple identical multicast media streams to different media stream receivers.

18 Claims, 6 Drawing Sheets

U.S. PATENT DOCUMENTS

| | | | |
|---|---|---|---|
| 6,003,116 | A | 12/1999 | Morita et al. |
| 6,119,205 | A | 9/2000 | Wicki et al. |
| 6,278,716 | B1 | 8/2001 | Rubenstein |
| 6,289,054 | B1 | 9/2001 | Rhee |
| 6,567,929 | B1 | 5/2003 | Bhagavath et al. |
| 6,608,841 | B1 | 8/2003 | Koodli |
| 6,766,418 | B1 | 7/2004 | Alexander et al. |
| 6,782,490 | B2 | 8/2004 | Maxemchuk et al. |
| 6,792,047 | B1 | 9/2004 | Bixby |
| 6,804,244 | B1 | 10/2004 | Anandakumar et al. |
| 6,865,157 | B1 | 3/2005 | Scott et al. |
| 6,910,148 | B1 | 6/2005 | Ho et al. |
| 7,114,002 | B1 | 9/2006 | Okumura et al. |
| 7,164,680 | B2 | 1/2007 | Loguinov |
| 7,180,896 | B1 | 2/2007 | Okumura et al. |
| 7,224,702 | B2 | 5/2007 | Lee |
| 7,234,079 | B2 | 6/2007 | Cheng et al. |
| 7,257,664 | B2 | 8/2007 | Zhang |
| 7,263,075 | B2 | 8/2007 | Roh et al. |
| 7,296,205 | B2 | 11/2007 | Curcio et al. |
| 7,324,527 | B1 | 1/2008 | Fraas et al. |
| 7,373,413 | B1 | 5/2008 | Nguyen et al. |
| 7,392,424 | B2 | 6/2008 | Ho et al. |
| 7,532,621 | B2 | 5/2009 | Birman et al. |
| 7,707,303 | B2 | 4/2010 | Albers |
| 2002/0114332 | A1 | 8/2002 | Apostolopoulos et al. |
| 2002/0126711 | A1 | 9/2002 | Robinett et al. |
| 2003/0101408 | A1 | 5/2003 | Martinian et al. |
| 2003/0158899 | A1* | 8/2003 | Hughes ................... 709/205 |
| 2003/0236903 | A1 | 12/2003 | Piotrowski |
| 2004/0071128 | A1 | 4/2004 | Jang et al. |
| 2004/0078624 | A1* | 4/2004 | Maxemchuk et al. ........... 714/4 |
| 2004/0100937 | A1 | 5/2004 | Chen |
| 2004/0114576 | A1 | 6/2004 | Itoh et al. |
| 2004/0143672 | A1 | 7/2004 | Padmanabham et al. |
| 2004/0196849 | A1 | 10/2004 | Aksu et al. |
| 2004/0244058 | A1 | 12/2004 | Carlucci et al. |
| 2005/0058131 | A1 | 3/2005 | Samuels et al. |
| 2005/0074007 | A1 | 4/2005 | Samuels et al. |
| 2005/0078698 | A1* | 4/2005 | Araya et al. ................. 370/432 |
| 2005/0099499 | A1 | 5/2005 | Braunstein |
| 2005/0198367 | A1* | 9/2005 | Ettikan ..................... 709/238 |
| 2005/0207406 | A1 | 9/2005 | Reme |
| 2005/0249231 | A1 | 11/2005 | Khan |
| 2005/0289623 | A1 | 12/2005 | Midani et al. |
| 2006/0075084 | A1 | 4/2006 | Lyon |
| 2006/0075443 | A1 | 4/2006 | Eckert |
| 2006/0083263 | A1 | 4/2006 | Jagadeesan et al. |
| 2006/0085551 | A1 | 4/2006 | Xie et al. |
| 2006/0120378 | A1 | 6/2006 | Usuki et al. |
| 2006/0126667 | A1 | 6/2006 | Smith et al. |
| 2006/0143669 | A1 | 6/2006 | Cohen |
| 2006/0159093 | A1 | 7/2006 | Joo et al. |
| 2006/0187914 | A1* | 8/2006 | Gumaste et al. ............ 370/389 |
| 2006/0188025 | A1* | 8/2006 | Hannuksela ............ 375/240.27 |
| 2006/0242240 | A1 | 10/2006 | Parker et al. |
| 2006/0242669 | A1 | 10/2006 | Wogsberg |
| 2006/0279437 | A1 | 12/2006 | Luby |
| 2007/0008934 | A1 | 1/2007 | Balasubramanian et al. |
| 2007/0044130 | A1 | 2/2007 | Skoog |
| 2007/0204320 | A1 | 8/2007 | Wu et al. |
| 2007/0214490 | A1 | 9/2007 | Cheng et al. |
| 2007/0268899 | A1 | 11/2007 | Cankaya |
| 2007/0277219 | A1 | 11/2007 | Toebes et al. |
| 2008/0189489 | A1 | 8/2008 | Mitra |
| 2008/0192839 | A1 | 8/2008 | Gahm et al. |
| 2008/0225850 | A1 | 9/2008 | Oran |
| 2008/0253369 | A1 | 10/2008 | Oran |
| 2008/0256409 | A1 | 10/2008 | Oran et al. |
| 2008/0267078 | A1 | 10/2008 | Farinacci |
| 2008/0310435 | A1 | 12/2008 | Cagenius et al. |
| 2009/0034627 | A1 | 2/2009 | Rodriguez |
| 2009/0034633 | A1 | 2/2009 | Rodirguez |
| 2009/0049361 | A1 | 2/2009 | Koren et al. |
| 2009/0055540 | A1 | 2/2009 | Foti et al. |
| 2009/0119722 | A1 | 5/2009 | VerSteeg |
| 2009/0150715 | A1 | 6/2009 | Pickens |
| 2009/0201803 | A1 | 8/2009 | Filsfils |
| 2009/0201805 | A1 | 8/2009 | Begen |
| 2009/0213726 | A1 | 8/2009 | Asati |
| 2010/0005360 | A1 | 1/2010 | Begen |
| 2010/0036962 | A1 | 2/2010 | Gahm |

FOREIGN PATENT DOCUMENTS

| | | |
|---|---|---|
| EP | 1581005 | 9/2005 |
| EP | 1608116 | 12/2005 |
| EP | 1670252 | 6/2006 |
| EP | 2008728919 | 2/2008 |
| EP | 7814245.2 | 5/2009 |
| EP | 2007814246 | 6/2009 |
| EP | 9831381.3 | 11/2009 |
| WO | 9718637 | 5/1997 |
| WO | 0035201 | 6/2000 |
| WO | 2000/076113 | 12/2000 |
| WO | 2001061909 | 8/2001 |
| WO | 2006031925 | 3/2006 |
| WO | 2006057606 | 6/2006 |
| WO | 2006107424 | 10/2006 |
| WO | 2008/000289 | 1/2008 |
| WO | 2008033644 | 3/2008 |
| WO | 2008033645 | 3/2008 |
| WO | 2008100725 | 8/2008 |
| WO | 2008112465 | 9/2008 |
| WO | 2009099847 | 8/2009 |

OTHER PUBLICATIONS

Luby, M., et al., "Forward Error Correction (FEC) Building Block", RFC 3452, Dec. 2002, 16 pages.
Schulzrinne, H., "RTP: A Transport Protocol for Real-Time Applications", RRC 3550, Jul. 2003, 89 pages.
Luby, M., et al., "Compact Forward Error Correction (FEC) Schemes," RFC 3695, Feb. 2004, 14 pages.
Ott, J., et al., "Extended RTP Profile for RTCP-based Feedback (RTP/AVPF)", draft-ietf-avt-rtcp-feedback-11, Aug. 10, 2004, 52 pages.
Watson, M., "Basic Forward Error Correction (FEC) Schemes", draft-ietf-rmt-bb-fec-basic-schemes-revised-02, Mar. 3, 2006, 17 pages.
Chesterfield, J. et al., "RTCP Extensions for Single-Source Multicast Sessions", draft-ietf-avt-rtcpssm-11, Mar. 6, 2006, 67 pages.
Rey, J., et al., "RTP Retransmission Payload Format", RFC 4588, Jul. 2006, 24 pages.
Pendleton, et al., Session Initiation Package for Voice Quality Reporting Event, Sipping Working Group, 2006, pp. 1-24.
USPTO, PCT International Search Report, Jul. 7, 2008, 3 pgs.—Different.
USPTO, PCT International Search Report, Jul. 7, 2008, 3 pgs.
Nguyen, Thinh and Avideh, Protocols for Distributed Video Streaming, Image Processing, 2002 Proceedings. 2002 Int, Dec. 10, 2002, vol. 3, 185-188, ISBN: 0-7803-7622-6.
International Search Report for PCT/US09/032305; Date of mailing Oct. 5, 2009.
Written Opinion of the International Searching Authority for PCT/US09/032305; Date of mailing Oct. 5, 2009.
International Search Report for PCT/US08/55837; Date of mailing Jul. 3, 2008.
Written Opinion of the International Searching Authority for PCT/US08/55837; Date of mailing Jul. 3, 2008.
Written Opinion of the International Searching Authority for PCT/US08/52907; Mailing Date Jul. 7, 2008.
Written Opinion of the International Searching Authority for PCT/US07/76264; Mailing date Jul. 7, 2008.
International Search Report for PCT/US07/76265 ; Mailing date Aug. 20, 2008.
Written Opinion of the International Searching Authority for PCT-US07-76265; Aug. 20, 2008.
Degalahal, et al., Analyzing Soft Errors in Leakage Optimized SRAM Design, Article, Jan. 2003, pp. 1-7, 16th International Conference On VLSI Design.
Zhang, Computing Cache Vulnerablity to Ransietn Errors And Its Implication, Article, Oct. 2005, pp. 1-9, IEEE Computer Society.

Weaver, et al. Reducing the Soft-Error Rate Of A High-Performance Microprocessor, Article, 2004, pp. 30-37, IEEE Computer Society.

Li, et al., Soft Error and Energy Consumption Interactions: A Data Cache Perspective, Article, Aug. 9, 2004, pp. 1-6, ISLPED '04.

Stolowitz Ford Cowger LLP, Listing of related cases Mar. 3, 2010.

Duffy, "Riverstone Recasts Multicast Video", 2 pages, Aug. 5, 2002, Network World Inc., www.networkworld.com/edge/news/2002/0805edge.html.

Lehman et al., Active Reliable Multicast (ARM), 1998, IEEE, pp. 581-589.

Liang et al., Feedback suppression in reliable multicast protocol, 2000, IEEE, pp. 1436-1439.

Adamson et al., Negative-Acknowledgment (NACK)-Oriented Reliable Multicast (NORM) Building Blocks (RFC 3941), Nov. 2004, RFC 3941 (IETF, ORG), pp. 1-37.

U.S. Appl. No. 11/736,463, filed Apr. 17, 2007—Prosecution History.

U.S. Appl. No. 11/735,930, filed Apr. 16, 2007—Prosecution History.

Supplementary European Search Report for EP08731381, Mar. 26, 2010, 7 pages.

Rey et al., "RTP Retransmission Payload Format—RFC 4588", Jul. 1, 2006, 29 pages.

Handley, M. et al., "SIP: Session Initiation Protocol", RFC 2543, Mar. 1999.

T. Friedman, "RTP Control Protocol Extended Reports (RTCP XR)", RFC 3611, Nov. 2003.

Ott, "Extended RTP Profile for RTCP-based Feedback (RTP/AVPF)" draft-ieft-av-rtcp-feedback-01-txt., Nov. 21, 2001.

Approach Inc., "Streaming Media Technical Analysis", Nov. 2000.

Turner, Jonathan S., "WDM Burst Switching" www.isoc.org/inet99/proceedings/4j/4j_3.htm, 1999.

GossamerThreads, "Channel Change Speed", www.gossamer-threads.com/lists/engine?do=post_view_flat;post=13776, Sep. 12, 2003.

Nguyen, Thinh et.al., Protocols for Distributed Video Streaming, IEEE ICIP 2002.

Byers, John W. et al., Accessing Multiple Mirror Sites in Parallel: Using Tornado Codes to Speed Up Downloads, IEEE 1999.

Cisco Systems, Cisco Visual Quality Experience: Product Overview, www.cisco.com/en/US/partner/prod/collateral/video/ps7191/ps7126/product_data_sheet0900aecd8057f446.html, 2009.

Cisco Systems, Converge IP and DWDM Layers in the Core Network, http://www.cisco.com/en/US/prod/collateral/routers/ps5763/prod_white_paper0900aecd80395e03.html, 2007.

Silver Peak Systems, Inc., "Data Center Class WAN Optimization: Latency & Loss Mitigation", www.silver-peak.com/Technology/latency_loss_mitigation.htm., 2010.

P. A. Chou and Z. Miao, "Rate-distortion optimized streaming of packetized media," Microsoft Research Technical Report MSR-TR-2001-35, Feb. 2001.

Lee, Jung-Hoon, J.S. Lee, and S.D. Kim. "A selective temporal and aggressive spatial cache system based on time interval." 2000 International Conference on Computer Design (IEEE), Proceedings, Sep. 17-20, 2000.

Rajamoni, Ramakrishnan, R. Bhagavathula, and R. Pendse. "Timing analysis of block replacement algorithms on disk caches." 43rd IEEE Midwest Symposium on Circuits and Systems, Proceedings, Aug. 8-11, 2000.

European Search Report for EP08728919; Aug. 19, 2010; 11 pgs.

Begen, Ali C., Enhancing The Multimedia Experience in Emerging Network, A Thesis Presented to The Academic Faculty; Dec. 2006; available at http://etd.gatech.edu/theses/available/etd-11062006-002415/; Dec. 2006.

* cited by examiner

RETRANSMISSION-BASED STREAM REPAIR AND STREAM JOIN

TECHNICAL FIELD

The present disclosure relates generally to a scheme for retransmission-based repair and fast stream join for Internet Protocol (IP) based media streams.

BACKGROUND

The Real-time Transport Protocol (RTP) and its related standards define a retransmission packet format and a way to give feedback via Negative ACKnowledgement (NACK) packets that data has been lost. The following standards RTP (RFC3550), RTP Retransmission (RFC4588), RTCP Feedback (RFC4585), and RTCP with SSM Sessions (draft-ietf-avt-rtcpssm-11.txt) are all incorporated by reference and describe unicast feedback and retransmission for unicast sessions, and unicast feedback with multicast retransmission for multicast sessions.

However, the RTP protocol suite has limitations when used with certain types of Internet Protocol (IP) media transmissions, such as transmitting streaming video to different endpoints. For example, neither RTP, nor any other common media transmission protocol, can perform unicast repair of multicast media streams or quickly and efficiently switch among different multicast media streams without loss of data.

DESCRIPTION OF EXAMPLE EMBODIMENTS

Overview

A Real-time Transport Protocol (RTP)-based unicast repair scheme is used for repairing errors in RTP multicast streams. By modeling the joining of a new media stream as a repair operation, the repair scheme is extended to also rapidly join media channels. It should be noted that the terms channel and stream are used interchangeably below.

Figure 1:
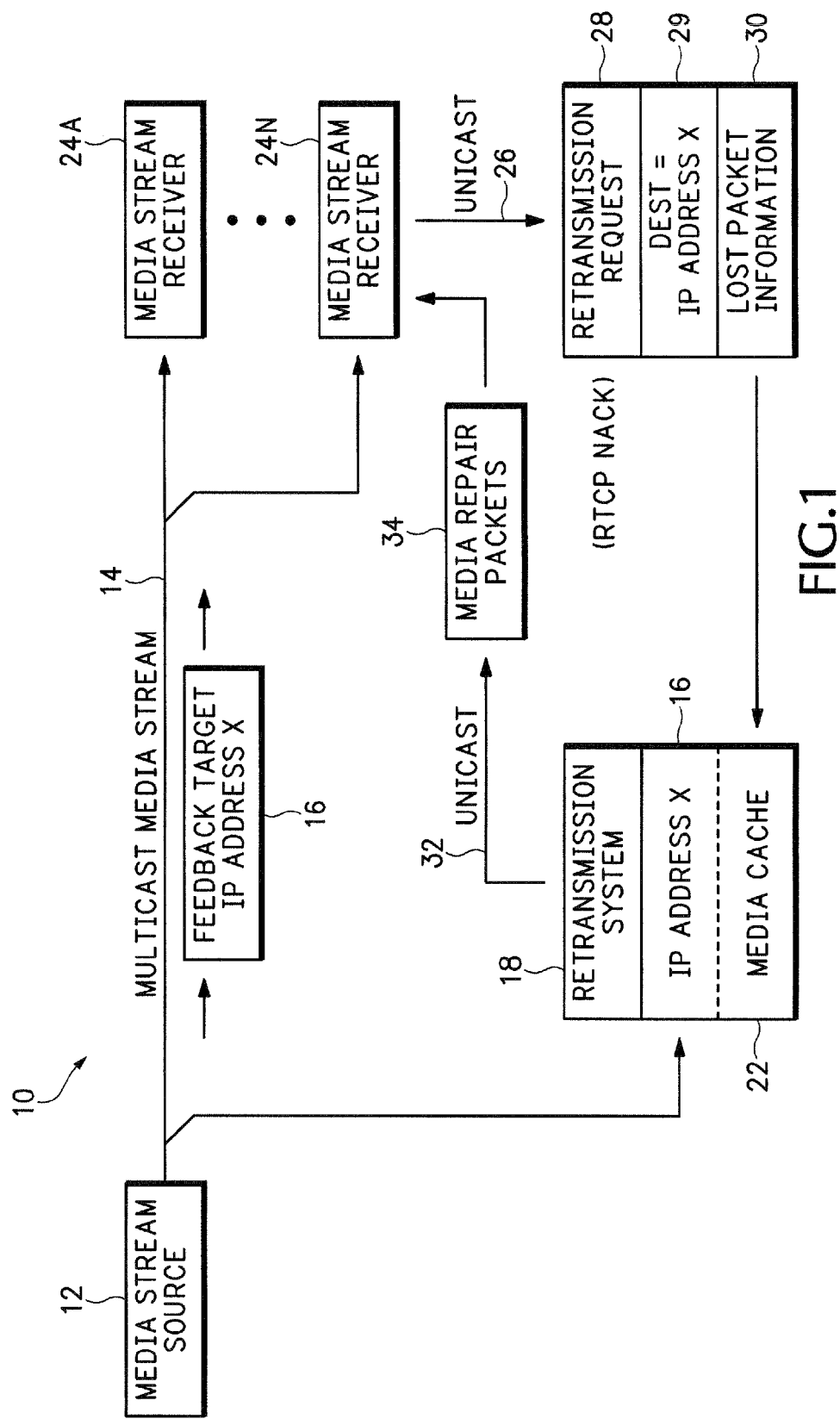
FIG. 1 shows a repair scheme used in a lookaside mode for multicast media streams.

Referring to FIG. 1, a media stream source 12 may be a server, computer, or any other type of network processing device that can source IP media, such as video, audio, voice, data, etc., over an Internet Protocol (IP) network 10. In this example, the media stream source 12 transmits a multicast media stream 14 over the IP network 10 which is received by different media stream receivers 24A-24N and also by a retransmission system 18.

The media stream receivers 24 can be any device that receives and stores or renders the multicast media stream 14. For example, the media stream receivers 24 could be Set Top Boxes (STB), Digital Video Recorders (DVR), computer terminals, Personal Computers (PCs), televisions with IP interfaces, Voice over IP (VoIP) phones, cell phones, Personal Digital Assistants (PDA), etc. The retransmission system 18 can be any type of media server that caches and retransmits portions of the multicast media stream 14. The media stream source 12 and retransmission system 18 are shown as separate devices but could reside in the same physical location and be connected together via a Local Area Network (LAN) or other backplane connectivity.

In one embodiment, a Source Specific Multicast (SSM) multicast session is established for transmitting the multicast media stream 14 between the media stream source 12 and one or more of the media stream receivers 24. The media stream source 12 knows the IP addresses and ports to use for transmitting a particular media stream. The retransmission system 18 knows what IP addresses and ports to use for receiving the media stream and what address and port to use for sending retransmissions. The media stream receivers 24 know what IP address and port to listen for the media stream and the retransmissions, and where to send retransmission requests. All of this address and port information can be described using Session Description Protocol (SDP), but other media description schemes could be used.

The feedback target IP address 16 is used by the media stream receivers 24 as a destination address for requesting retransmissions for portions of the multicast media stream 14. For example, packets from the media stream 14 may not successfully arrive at particular media stream receivers, or may be received in a corrupted state.

The media stream receivers 24 send retransmission requests 28 to the retransmission system 18 associated with the feedback target IP address 16 that includes information 30 identifying the lost media packets. In one example, retransmission requests 28 are unicast Real-time Transport Control Protocol (RTCP) Negative ACKnowledge (NACK) packets that use the feedback target address 16 as a destination address 29. Sending the unicast RTCP NACK packet 28 to the retransmission system 18 dynamically instantiates a unicast RTP repair session from the retransmission system to the requesting receiver, if one does not already exist.

The retransmission system 18 includes a media cache 22 that caches the recent history of packets from the multicast media stream 14. During the unicast RTP repair session, lost packets for media stream 14 are identified in lost packet information 30 of the retransmission request 28. The retransmission system 18 identifies the packets in media cache 22 corresponding to the lost or corrupted packet information 30 in retransmission request 28.

The identified media packets in media cache 22 are sent as unicast media repair packets 34 back to the requesting media stream receiver 28. The media stream receiver 24 then inserts the received unicast media repair packets 34 into corresponding lost packet locations in the media stream 14. Thus, in one embodiment, a repair session uses unicast NACK packets 28 and unicast media repair packets 34 for repairing a multicast media session.

The media configuration shown in FIG. 1 is referred to as a "lookaside mode" because the retransmission system 18 (repair element) is not required to relay the original media stream 14 to the media stream receivers 24. Instead, the media stream source 12 multicasts the media stream 14 directly to the receivers 24. The lookaside mode may produce higher availability since the media stream 14 is not necessarily disrupted if the retransmission system 18 crashes or becomes unavailable.

In this example, only the unicast repair function ceases when the retransmission system 18 fails. Higher performance may also be provided since the retransmission system 18 only receives and caches the multicast media stream 14 and does not also have to retransmit the media stream 14 to the media stream receivers 24. Thus, by only providing media stream repair, the constant work factor for the retransmission system 18 is halved.

In the lookaside mode, the retransmission system 18 is distinguished from the media stream source 12 by using a feedback target address 16 for the retransmission system 18 that is different from the source IP address associated with the SSM media stream source 12.

IP Anycast Addressing

Figure 2:
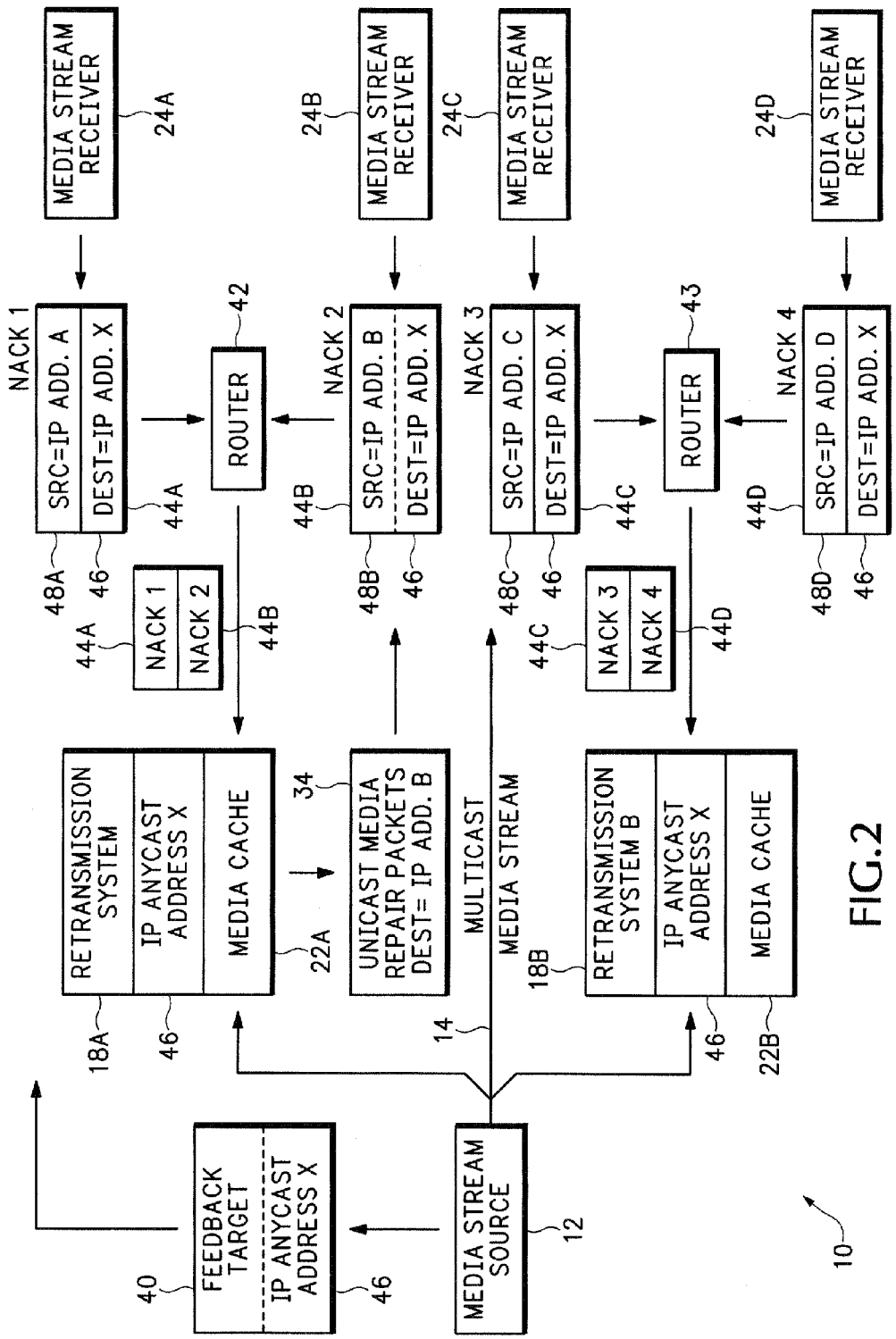
FIG. 2 shows the repair scheme in FIG. 1 using IP anycast addresses.

Referring to FIG. 2, in order to provide both high availability and load sharing, one embodiment of the repair scheme uses an IP anycast address 46 as the feedback target address for the retransmission system 18. This allows repair operations to be adaptively directed to the optimal currently available retransmission system 18A or 18B. The anycast addressing scheme exploits the metrics of IP unicast routing that automatically route packets to network processing devices associated with the cheapest IP routing cost.

To explain in more detail, message 40 identifies a single IP anycast address 46 for multiple different retransmission systems 18A and 18B available for repairing the multicast media stream 14. This SDP is provided to both the retransmission systems 18A and 18B, as well as to the receivers so that they will direct their retransmission requests to that anycast feedback address. Both retransmission system 18A and 18B cache the media stream 14 and are available for retransmitting lost packets to any of the media stream receivers 24A-24D.

Both of the retransmission systems 18A and 18B share the same IP anycast source address 46 identified in message 40. An IP anycast address refers to a unicast IP address that is used as a destination address simultaneously by multiple network processing devices. In this example, the network processing devices sharing IP address 46 include retransmission systems 18A and 18B.

The retransmission systems 18A and 18B and the media stream receivers 24 operate in substantially the same manner as described above in FIG. 1. In this example, all of the media stream receivers 24A-24D each receive the same multicast media stream 14 from media stream source 12. Alternatively, the media stream receivers 24 could indirectly receive the multicast media stream 14 via a separate multicast stream sourced from one of the retransmission systems 18A or 18B. This embodiment is referred to as "source mode" and is described in more detail below in FIG. 4.

Any of the media stream receivers 24A-24D may detect lost or corrupted packets or frames from the multicast media stream 14. In response, the receiver 24 sends out a unicast NACK retransmission request message 44. For explanation purposes, each of the media stream receivers 24A-24D in FIG. 2 is currently receiving the media stream 14 and one or more of them has identified lost packets from the media stream 14. Respectively, the receivers 24A-24D experiencing loss or corruption send out retransmission request messages 44A-44D.

Each of the retransmission request messages 44A-44D includes the same IP anycast destination address 46 along with the associated media stream receiver source address 48A-48D, respectively. The retransmission request messages 44A-44D also include lost packet information identifying which of the packets were lost from the multicast media stream 14.

Routers 42 and 44 in the IP network 10 use internal routing metrics to select which of the retransmission systems 18A or 18B has the cheapest IP routing cost for routing the messages 44A-44D. Since the IP anycast address 46 is shared by two different network processing devices 18A and 18B, the conventional routing metrics in the routers 42 and 43 will automatically select one of the two devices 18A or 18B for forwarding any messages 44A-44D. In this example, router 42 determines that retransmission system 18A has the shortest routing path for the retransmission request messages 44A and 44B received from receivers 24A and 24B, respectively. Alternatively, router 43 determines that retransmission system 18B has the shortest routing path for the retransmission request messages 44C and 44D received from receivers 24C and 24D, respectively.

Retransmission system 18A receives unicast NACK retransmission request messages 44A and 44B and retransmission system 18B receives unicast NACK retransmission request messages 44C and 44D. The retransmission system 18A responds back by sending unicast media repair packets from its cache of multicast media stream 14 back to receivers 24A and 24B. For example, retransmission system 18A sends unicast media repair packets 34 back to the media stream receiver 24B identified in message 44B. Retransmission system 18B responds to retransmission request messages 44C and 44D by sending unicast media repair packets from its cache of multicast media stream 14 back to receivers 24C and 24D, respectively.

This distributed routing of retransmission requests 44A-44D increases both availability and load sharing capacity while using substantially the same repair scheme described above in FIG. 1. For example, if either of the retransmission systems 18A or 18B is disabled, the routers 42 and 44 will automatically drop the disabled retransmission system from internal routing tables. Accordingly, repair requests previously routed to the disabled retransmission system 18 are automatically rerouted to a different one of the operational retransmission systems 18.

Figure 3:
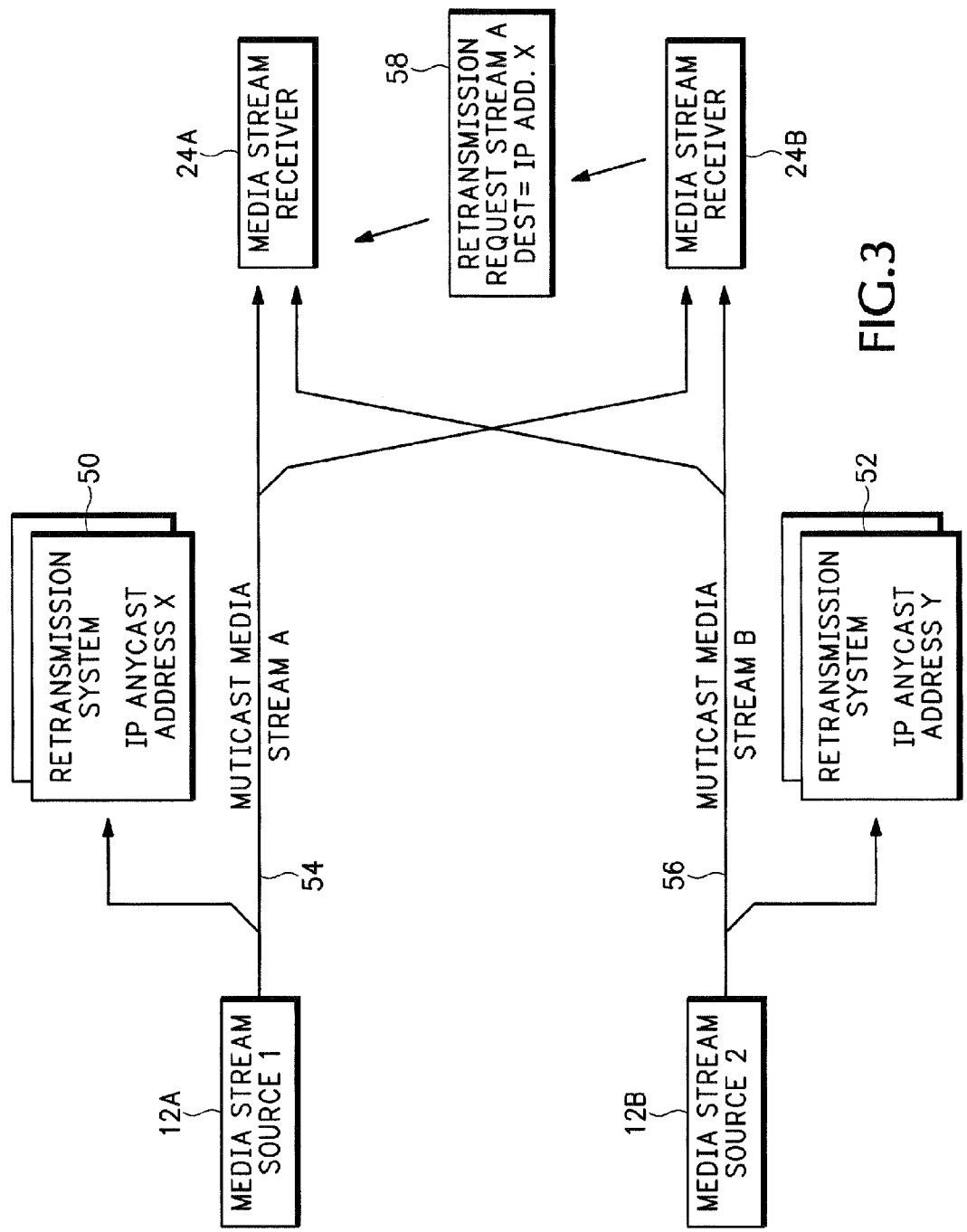
FIG. 3 is a diagram showing how different media streams can be associated with different IP anycast addresses.

FIG. 3 shows different IP anycast addresses used as feedback addresses for different media streams 54 and 56. This further increases the scalability of the media repair scheme by allowing one or more different retransmission systems 50 and 52 to be associated with different multicast media streams.

For example, one or more retransmission systems 50 can be specifically designated to provide media packet repair for a particular multicast media stream 54. The feedback target IP anycast address identified in the Source Specific Multicast (SSM) multicast session for multicast media stream 54 is used as the source address for each of the retransmission systems 50. Similarly, one or more retransmission systems 52 can be designated to provide media packet repair support for a different multicast media stream 56. The feedback target IP anycast source address identified in the SSM multicast session for the multicast media stream 56 is used as the source address for each of retransmission systems 52.

In this example, media stream receiver 24B is receiving packets for multicast media stream 54. If any of the multicast packets are lost, media stream receiver 24B sends a unicast NACK retransmission request message 58 to the IP anycast destination address X associated with multicast media stream 54. The routers in the IP infrastructure (not shown) automatically route the retransmission request message 58 to one of the retransmission systems 50 which then sends back unicast media repair packets containing the identified lost packets.

Thus, different retransmission systems can be associated with different media streams to further increase the repair scheme scalability. However, in other embodiments, a retransmission system 50 may provide repair support for more than one media stream.

Figure 4:
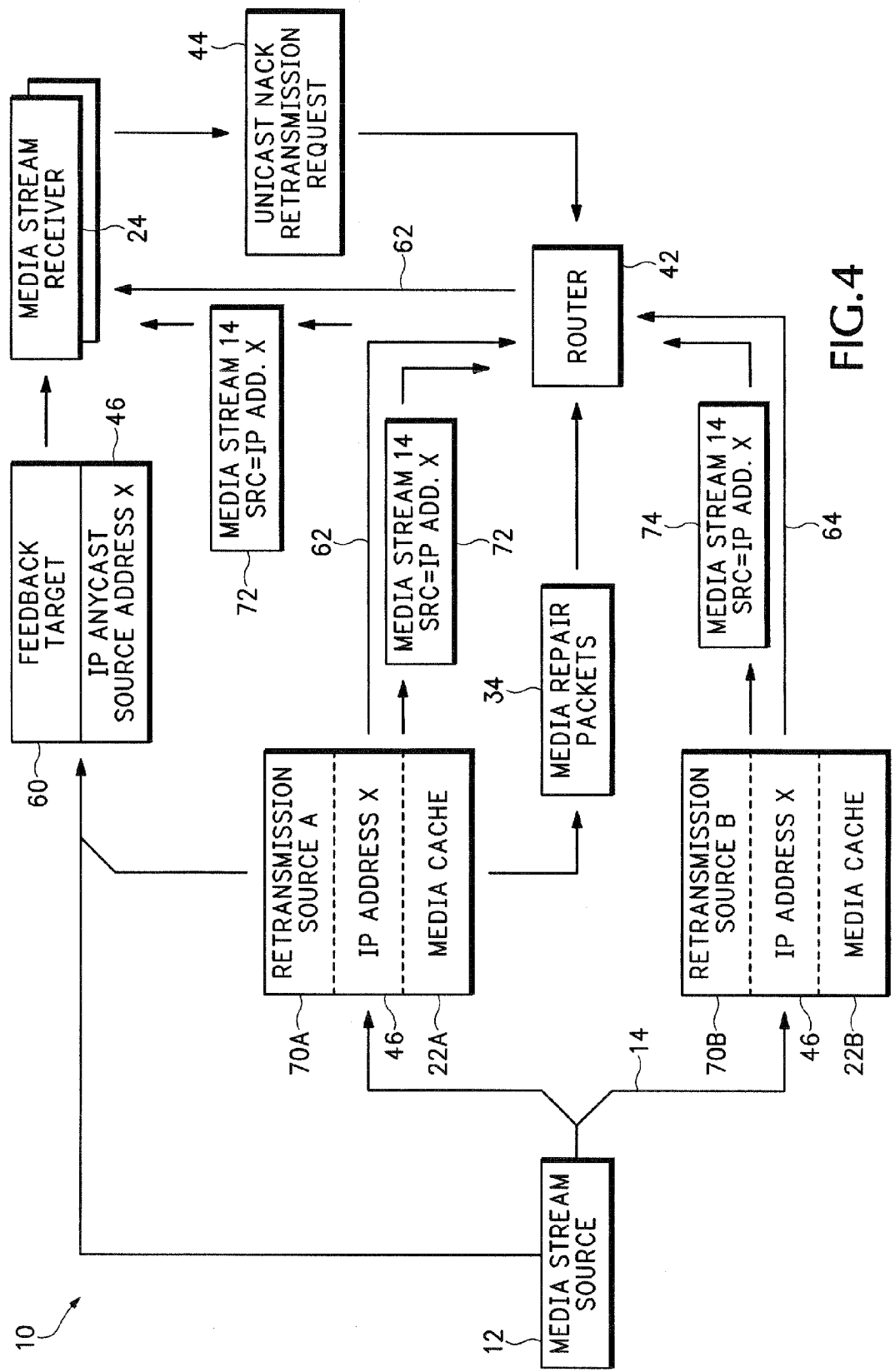
FIG. 4 is a diagram showing how the repair scheme is used in a source mode.

FIG. 4 shows an alternative "source mode" for the repair scheme. In the source mode, retransmission sources 70 provide media stream repair and also operate as SSM distribution sources for the multicast stream 14 originally generated by media stream source 12. The media stream source 12 could be a local encoder, a local splicer, or a separate media stream server operating remotely in the IP network 10 from the retransmission sources 70A and 70B.

The retransmission source 70A caches the original media stream 14 in media cache 22A and if necessary "re-sources" the received media stream 14, operating as a legal RTP mixer/translator according to the RTP specifications. Similarly, retransmission source 70B retransmits the original media stream 14 cached in media cache 22B as multicast media stream 64.

In the source mode, the retransmission sources 70A and 70B still receive unicast NACK retransmission request messages 44 from the media stream receivers 24 when multicast media stream packets are lost. The retransmission sources 70 accordingly send back unicast media repair packets 34 containing the requested lost media.

In one embodiment, the two retransmission sources 70A and 70B also still share the same IP source address 46. This common IP source address 46 for the feedback target can again be identified for the multicast media session using out-of-band or in-band messaging. The messages 60 exchanged between the media stream source 12, retransmission sources 70, and the media stream receivers 24, associate media stream 14 with feedback target IP anycast address 46.

Sharing the same IP destination address 46 provides high availability and load sharing for the repair scheme similar in a similar manner as described above in FIG. 2. However, both retransmission sources 70A and 70B in FIG. 4 also operate as retransmission sources for the media stream 14. Therefore, sharing the same SSM source address 46 also provides higher availability and load sharing with respect to the multicasting of the original media stream 14. Use of an anycast IP address as the SSM source address for the media source provides this capability as well.

For example, retransmission source 70A re-originates media stream 14 as multicast media stream 62 and retransmission source 70B re-originates media stream 14 as multicast media stream 64. The multicast packets 72 for multicast media stream 62 and the multicast packets 74 from multicast media stream 64 each use the same source IP address 46.

Any routers 42 in the IP network 10 receiving both media streams 62 and 64 with the same source address automatically drop packets for one of the two streams according to a basic characteristic of multicast routing known as "reverse path forwarding". For packets being forwarded on a multicast tree, only those received from the upstream branch leading to the source IP address at the root of the tree are accepted for forwarding. In this example, the router 42 drops the multicast packets 74 for media stream 64 and only routes the multicast packets 72 for media stream 62 to the media stream receiver 24.

If retransmission source 70A is ever disabled, the router 42 will re-compute internal routing metrics and then automatically start routing the multicast packets 74 for media stream 64 to media stream receiver 24. Accordingly, using the shared IP anycast address 46 and the SSM source address also provides redundancy and load sharing for the multicast media stream source.

The shared IP source address 46 still increases retransmission repair redundancy and load balancing as described above in FIG. 3 by allowing either of the retransmission sources 70A or 70B to receive and respond to the retransmission requests 44 sent by any of the media stream receivers 24 as described above in FIG. 3. It is also possible that one of the retransmission sources 70 may end up re-originating the multicast media stream to the receiver 24 while the other retransmission source 70 provides media stream repair support by receiving unicast retransmission requests 44 and responding back with media repair packets 34.

Extension of Repair Scheme for Fast Stream Join

Several observations can be made with respect to a stream join as compared with a media stream repair operation. A media stream receiver joining a new RTP session may have no idea what packets are needed to render the current stream. Also since multicast video sessions may be involved the media stream receiver is in all likelihood "behind" the multicast stream in time and may need to "catch up". This is important because the media stream receiver may not be able to render the media stream until it receives an intra-coded frame that may have passed by shortly before the media stream receiver attempts to join the multicast session.

Figure 5:
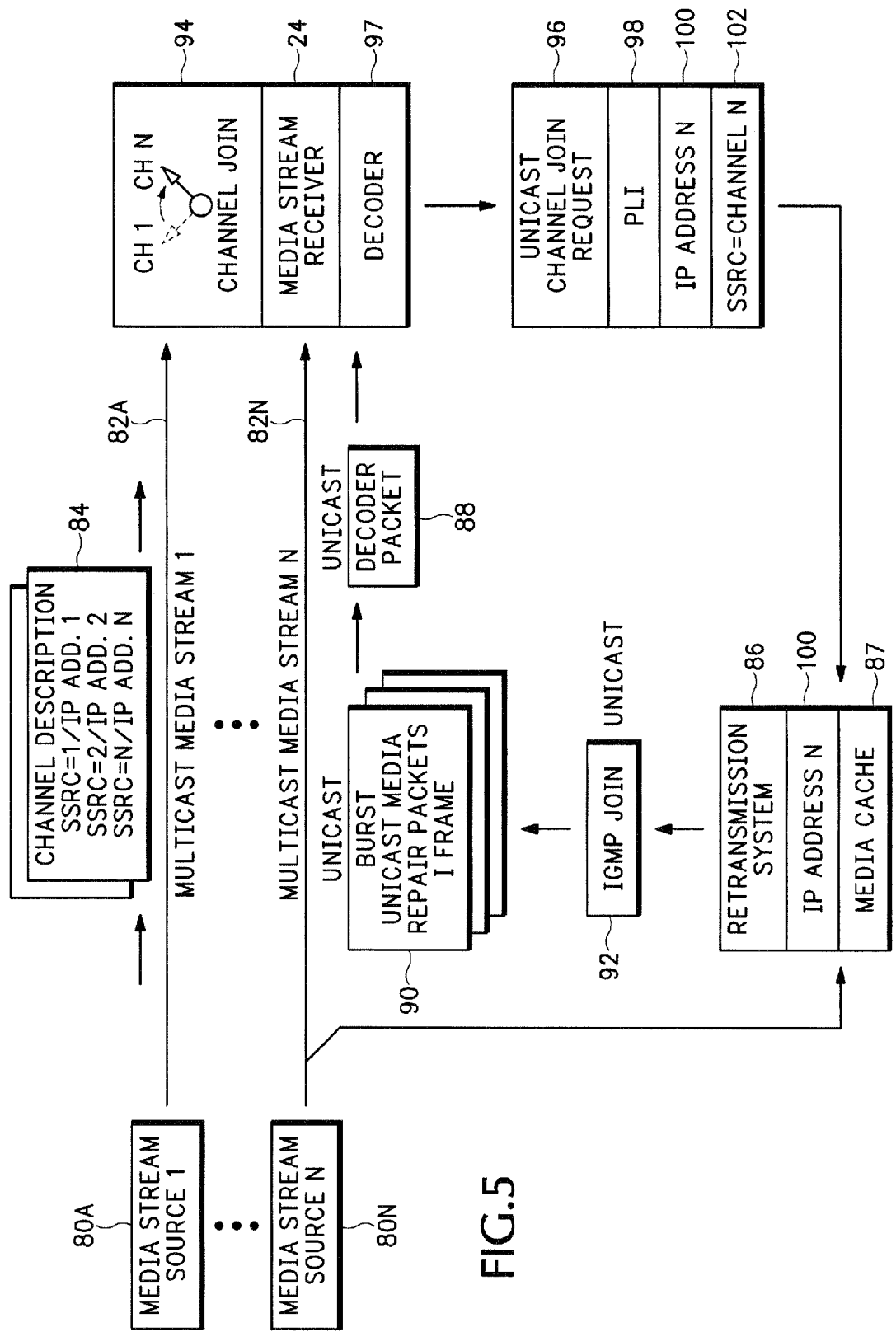
FIG. 5 is a diagram showing another embodiment of a retransmission scheme used for channel joining.

Referring to FIG. 5, a fast stream join scheme (alternatively referred to as a fast channel join) uses a variant of the repair schemes described above. Multiple different multicast media streams 82A-82N are generated by different media stream sources 80A-80N, respectively. Synchronization SouRCes (SSRCs) used by the media streams are communicated out of band to the media stream receivers 24 in the SDP messages 84. The SDP messages 84 also include the feedback target IP addresses for the one or more retransmission systems 86 associated with repairing the multicast media streams as described above.

A media stream receiver 24 detects a request to join a new multicast media stream and sends a unicast request 96 to the retransmission system 86 specifying the new channel which the receiver wishes to receive. A channel join request may detected, for example, by a set top box that detects a user using user interface 94 to select a new or different multicast media channel.

The unicast channel join request 96 in one embodiment is substantially the same RTCP NACK retransmission request message described above in FIGS. 1-4. However, in this embodiment, the message 96 is a NACK packet containing a Picture Loss Indication (PLI) 98. The PLI indication 98 notifies the retransmission system 86 to send all of the information needed to join a new identified media stream 102. This is different from the retransmission request messages 28 in FIG. 1 that instead requests specific lost packets from an already connected media stream.

The channel join request 96 is sent by the media stream receiver 24 to the feedback target address 100 for the retransmission system 86 associated with the identified new media stream 102. It is worth noting that initiation of the fast channel/stream join scheme is similar to the repair scheme described above since it exploits the same NACK and retransmission machinery.

Figure 6:
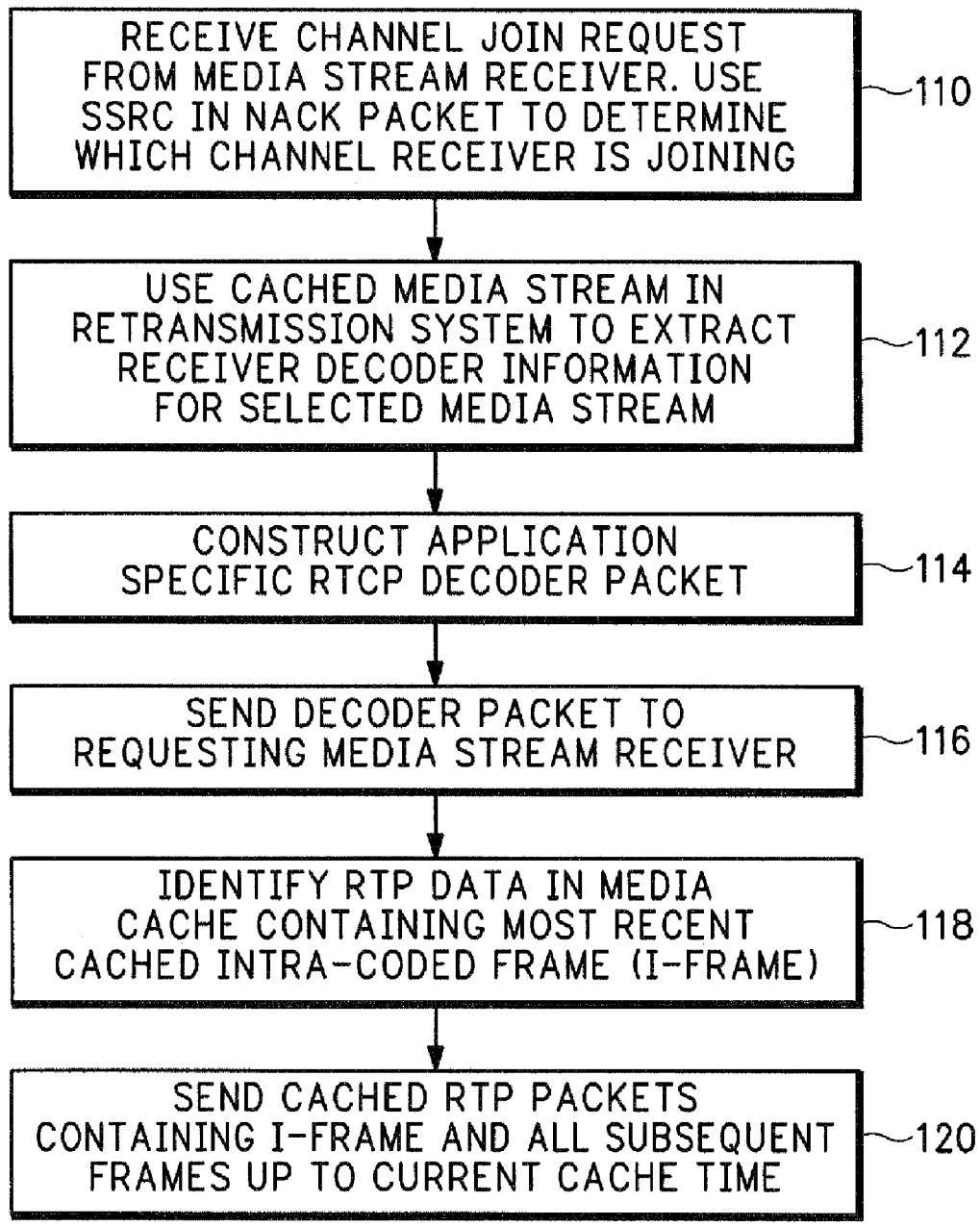
FIG. 6 is a flow diagram explaining in more detail the retransmission scheme shown in FIG. 5.

Referring to both FIG. 5 and FIG. 6, the retransmission system 86 performs the following operations when the channel join request 96 is received. In operation 110, the retransmission system 86 determines which media stream channel the receiver 24 is joining using the SSRC 102 in the unicast NACK channel join request 96 and the destination transport address and port of the NACK packet. As described above, the SSRC 102 was previously communicated to the receiver 24 in the channel description of SDP message 84.

In operation 112, the retransmission system 86 uses the cached video information for the selected media stream to extract from the cache all the elements the receiver 24 may need to "prime" its decoder 97. This may include a Moving Pictures Experts Group (MPEG) Program Association Table (PAT) and Program Map Table (PMT) elements, Encryption Control Messages (ECMs) and possibly other non-video data needed by the decoder 97. The retransmission system 86 in operation 114 constructs a Real-time Transport Control Protocol (RTCP) APPlication-specific (APP) decoder packet 88 and in operation 116 sends the decoder priming packet 88 to the media stream receiver 26 that requested the channel join.

In operation 118, the retransmission system 86 references back into media cache 87 for the RTP data containing the most recent cached intra-coded frame (I-frame). In operation 120, the retransmission system 86 sends the cached RTP packets containing the I-frame and all subsequent frames 90 up to a current cache time to the media stream receiver 24. The identified frames 90 are burst to the receiver 24 at a much faster speed than what the media in the packets is actually rendered by receiver 24 (i.e., faster than real-time). This speeds up the channel join process by allowing the receiver to render video going back to the previous I-frame.

The portions of the stream sent back are not necessary to simply join the new stream. The receiver can join the stream just by knowing the SDP for the media stream and performing a conventional IGMP join operation without asking for channel join. The burst of the cached data back from the prior I-frame allows the receiver to start rendering before the join completes and the next I-frame arrives. If the data were not burst faster than real-time, the receiver would not be able to "catch up" with the multicast stream, which is ahead of the receiver in time. Thus, the burst frames are essentially "back filling" to the previous I-frame so the receiver is able to render media prior to when the next I-frame arrives on the multicast stream.

The decoder 97 in the receiver 24 is primed with the information from the decoder packet 88 and media frames 90. After being primed and receiving the burst, the receiver 24 can join the multicast group for the new stream and can start rendering any subsequent media from the joined multicast media stream 82N.

As with the basic packet repair operations, the fast channel join scheme can exploit any of the anycast-based availability and load sharing features provided either by the look aside mode scheme in FIGS. 2 and 3 or the source mode scheme shown in FIG. 4. Various embodiments are anticipated whereby the repair or channel join schemes are used by service providers offering IPTV service over a variety of access networks, including, but not limited to, Digital Subscriber Loop (DSL), cable, WiMax, etc.

It is also worth noting that the media repair and channel join schemes are essentially stateless. They maintain no state about individual receivers except during a repair or channel join operation. This allows the system to scale much better than a system in which permanent or semi-permanent state is kept in the retransmission system about each receiver potentially wishing to request repair or channel join operations. The normal routing states in the routers in the IP network provide any knowledge required for ensuring retransmission requests or channel join requests are directed to operational retransmission systems 18. The routing metrics in the IP network routers also, as a by-product, provide a degree of load balancing.

Thus, the media source, retransmission systems, and media stream receivers associated with a media stream are not required to keep track of which media stream sources or which retransmission systems are operational, or which media stream receivers are currently connected to which media streams.

The RTP unicast repair scheme also does not require the retransmission systems to remember what repair or channel join packets have been previously received or sent to media stream receivers. Each retransmission or channel join request can be a single unitary request that is answered with a single response or group of responses by the retransmission system with no required state knowledge of what other repair operations have been previously performed for the requesting receiver.

Thus, the use of RTP protocol machinery with the above described extensions allows the creation of a unified technique for both retransmission-based media stream repair and fast channel joining (i.e., stream joining). Operation in either the lookaside mode or source mode can use anycast-based feedback addressing to improve scalability, robustness, and performance. Separate operations are unified with common mechanisms and low protocol, state, and computational overhead.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I/We claim all modifications and variation coming within the spirit and scope of the following claims.

The invention claimed is:

1. An apparatus comprising:
a media retransmission device configured to cache portions of an Internet Protocol (IP) transmitted media stream and share an IP address with one or more other media retransmission devices,
wherein the shared IP address is for addressing retransmission requests sent from one or more multicast media stream receivers, wherein the shared IP address is further for directing retransmission requests to be distributed back to the media retransmission device according to IP network topology relationships between the media retransmission device and a subset of media stream receivers;
wherein the media retransmission device is configured to re-originate the IP transmitted media stream by mimicking a Real-Time Transport Control Protocol (RTCP) translator; and
wherein the retransmission requests are RTCP Negative Acknowledgement (NACK) packets that include the shared IP address as a destination address and lost packet information, wherein the NACK packets dynamically instantiate a unicast RTP repair session from a retransmission system to a requesting receiver.

2. The apparatus according to claim 1 wherein the shared IP address triggers IP network routers to distribute the retransmission requests sent from the media stream receivers to different media retransmission devices sharing the IP address and having a least expensive IP routing cost.

3. The apparatus according to claim 1 wherein the shared IP address is associated with a plurality of media streams.

4. The apparatus according to claim 1 wherein the media retransmission device caches packets of a multicast media stream from a media stream source and receives unicast retransmission request packets from the media stream receivers that use the shared IP address and wherein the IP address is identified during an IP media streaming session.

5. The apparatus according to claim 4 wherein the media retransmission device sends unicast media repair packets back to the media stream receivers sending the retransmission request packets containing lost portions of the multicast media stream.

6. The apparatus according to claim 1 wherein the media retransmission device operates as both an IP media stream transmission source and retransmission repair source for the media stream.

7. The apparatus according to claim 1 wherein the media retransmission device operates only as a retransmission source for the media stream and a second transmission device operates as an original transmission source for the media stream.

8. An apparatus comprising:
a media retransmission device configured to cache portions of an Internet Protocol (IP) transmitted media stream, re-originate the IP transmitted media stream, share an IP address with one or more other media retransmission devices and identify the shared IP address to one or more receivers receiving the media stream,
wherein the shared IP address is further for directing retransmission requests to be distributed back to the media retransmission device from the one or more receivers according to IP network topology;
wherein a received retransmission request if identified as a media stream repair request then the received retransmission request is configured to trigger the media retransmission device to send back cached media stream packets lost or corrupted from the media stream wherein the retransmission request is an RTCP Negative Acknowledgement (NACK) packet that includes the shared IP address as a destination address and lost packet information and wherein the NACK packet dynamically instantiates a unicast RTP repair session the media retransmission device to a requesting receiver;
else if the received retransmission request is identified as a channel join request then the received retransmission request is configured to trigger the media retransmission device to send decoder information and a group of cached media stream frames required for decoding a new media stream.

9. An apparatus comprising:
a media stream receiver configured to send a unicast retransmission request for either requesting retransmission for a portion of a currently received multicast media stream or requesting joining a new multicast media stream, the media stream receiver further configured to receive back unicast repair packets that either contain the requested portion of the currently received media stream or contain a portion of the requested new media stream;
wherein the retransmission request or the request to join the new multicast media stream is sent to a feedback target address identified during a multicast session;
wherein the feedback target address is different from an Internet Protocol (IP) address of a source of the received media stream;
wherein the feedback target address is used for addressing the retransmission request; and
wherein the retransmission request or the request to join the new multicast media stream dynamically instantiates a unicast RTP repair session from a retransmission system to the media stream receiver.

10. The apparatus according to claim 9 wherein the unicast retransmission request used for requesting retransmission of the currently received media stream is a Real-time Transport Control Protocol (RTCP) Negative Acknowledgement (NACK) packet and the unicast retransmission request used for requesting joining the new media stream is a RTCP NACK packet reporting Picture Loss Indication (PLI);
wherein the feedback target address is associated with a plurality of media streams originating from different independent media stream devices.

11. The apparatus according to claim 9 wherein the media stream receiver sends a lost packet message in the retransmission request that causes an identified portion of the currently received media stream to be transmitted back and sends a channel join message to cause a decoder information portion of a new media stream necessary for decoding the new media stream to be transmitted back.

12. The apparatus according to claim 9 wherein the feedback target address is an Internet Protocol (IP) anycast address that is shared by multiple different retransmission devices, the IP anycast address causing the retransmission request to be routed to one of the multiple different retransmission devices with a least expensive routing cost.

13. An apparatus comprising:
a media retransmission device configured to independently receive a multicast media stream from a remote source multicasting media device over an Internet Protocol (IP) network and to cache the multicast media stream in a local media cache that is separate from the remote multicasting media device,
wherein the media retransmission device is a separate independently operating IP network device located in a separate IP network location from the multicasting device,
the media retransmission device further configured to:
receive a unicast Internet Protocol (IP) message from a media stream receiver, the unicast IP message configured for requesting retransmission of at least a portion of the cached multicast media stream; and
responsive to the unicast IP message, unicast the cached portions of the multicast media stream corresponding with the requested portion of the cached multicast media stream back to the media stream receiver, wherein the unicast IP message dynamically instantiates a unicast RTP repair session from a retransmission system to the requesting media stream receiver;
wherein an IP address of the media retransmission device is different from the source multicasting media device IP address and wherein the IP address of the media retransmission device is used for addressing retransmission requests.

14. The apparatus according to claim 13 wherein the media retransmission device is configured to re-multicast the cached multicast media stream by mimicking a Real-Time Transport Control Protocol (RTCP) translator.

15. The apparatus according to claim 13 wherein the media retransmission device is configured to identify requests in the unicast IP message to retransmit lost media packets from the multicast media stream and then send back portions of the cached multicast media stream corresponding with the lost media packets.

16. The apparatus according to claim 13 wherein the media retransmission device is configured to identify requests in the unicast IP message to join a new media stream and then burst cached data back allowing a receiver to start rendering the new media stream.

17. The apparatus according to claim 16 wherein the media retransmission device is configured to send decoder information and burst a group of the cached media stream that includes an intra-coded media frame (I-frame) required for decoding the portions of the new media stream prior to the next I-frame to be transmitted on a native multicast for that stream.

18. The apparatus according to claim 13 wherein the media retransmission device is configured to transmit a multicast media stream and share an Internet Protocol (IP) source address with other media retransmission devices transmitting a same multicast media stream, the shared IP source address causing only one of the multiple multicast media streams to be routed to any one media stream receiver.

* * * * *

UNITED STATES PATENT AND TRADEMARK OFFICE
CERTIFICATE OF CORRECTION

Page 1 of 1

PATENT NO. : 8,031,701 B2
APPLICATION NO. : 11/561237
DATED : October 4, 2011
INVENTOR(S) : Oran It is certified that error appears in the above-identified patent and that said Letters Patent is hereby corrected as shown below:

On Title pg. 2, Item (56), at Foreign Patent Documents, please replace "9831381.3" with --8731381.3--.

At column 9, line 42, please replace "session the media" with --session from the media--.

Signed and Sealed this
Tenth Day of April, 2012

David J. Kappos
*Director of the United States Patent and Trademark Office*